UNITED STATES PATENT OFFICE.

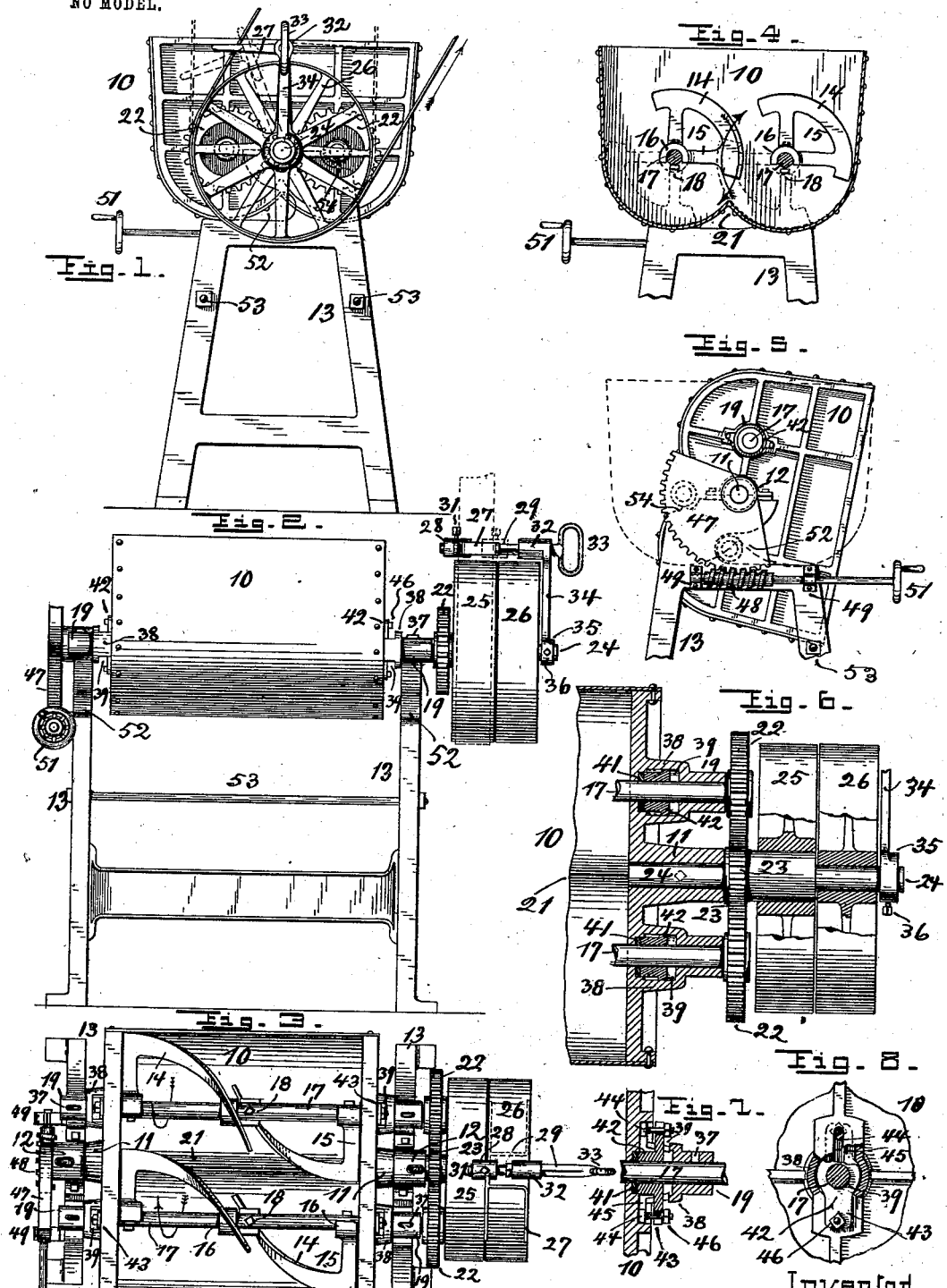

HENRY C. CHAMBERS, OF CINCINNATI, OHIO, ASSIGNOR TO CHAMBERS MACHINE CO., OF CINCINNATI, OHIO.

MIXING-MACHINE.

SPECIFICATION forming part of Letters Patent No. 723,987, dated March 31, 1903.

Application filed May 31, 1902. Serial No. 109,647. (No model.)

*To all whom it may concern:*

Be it known that I, HENRY C. CHAMBERS, a citizen of the United States, and a resident of the city of Cincinnati, in the county of Hamilton and State of Ohio, have invented certain new and useful Improvements in Mixing-Machines; and I do declare the following to be a clear, full, and exact description thereof, attention being called to the accompanying drawings, with the reference-numerals marked thereon, which form also a part of this specification.

This invention relates to improvements in machines used for agitating plastic, comminuted, granulated, or powdered substances, like chopped meat, dough, sand, plaster, &c., the object being to thoroughly intermingle the various ingredients composing the mixture. Such machines comprise generally a suitable vessel to contain the substance to be mixed, devices to agitate these latter for such purpose, and means to operate these devices.

The invention consists of certain features of arrangement and construction of the parts mentioned whereby certain advantages and results are obtained, one of which is an improved action of the mixing and agitating devices, another being the possibility of tipping the vessel, permitting quick and convenient removal of the contents thereof by dumping the same.

In the following specification and particularly pointed out in the claim following is found a full description of the invention, together with its operation, parts, and construction, which latter is also illustrated in the accompanying drawings, in which—

Figure 1 is an end view of my improved mixing-machine. Fig. 2 is a front view of the same. Fig. 3 is a top view of it. Fig. 4 is a vertical cross-section thereof. Fig. 5 is a view of the other end of the machine, showing also the vessel tipped so as to dump its contents. Fig. 6 is an enlarged horizontal section of one end of the machine to show certain details, particularly as to the shaft-bearings. Fig. 7 is a vertical section of one of these latter, and Fig. 8 a front view thereof with parts broken away.

The matter to be intermixed is contained in a trough-shaped vessel 10, the ends of which are formed of parallel heads, from each of which projects a trunnion-journal 11, which occupy each a bearing 12 in frames 13, one on each side, and whereby the vessel is supported in a manner to be free to be tipped. For agitating the contents there are a number of blades 14, each carried by arms 15, angularly arranged, and each of which has an open hub 16, whereby they are attached to their driving-shafts 17 by means of screws 18. By attaching them in this manner any of the blades may be readily removed, if necessary, for any purpose without requiring the particular shaft to be taken out. There are two of these latter supported horizontally in bearings 19, which project outwardly from the heads, one on each side of the trunnion-journal thereat and at equal distance therefrom. The distance between the shafts is such as to cause in the middle part of the trough the outer parts of the blades those supported on one shaft to reach over beyond the center and travel through part of the rotary path of the blades on the other shaft. They are so set, however, as to clear each other. The interior surface of the trough is shaped to correspond to the path of the outer edge of these blades, so that these latter pass closely to such surface, thereby preventing any dead spaces, where matter might accumulate beyond the range of these blades, and thereby escape their action. By reason of the lapping in the center of the rotary paths of these blades the bottom of the trough is given a shape as shown, producing a longitudinal ridge 21, which extends through the trough from end to end. The shafts and the blades thereon are rotated in the same direction, which causes the outer parts of these blades where they pass through the same space in the center of the vessel and between the shafts to travel in opposite directions. The effect of this movement is that the mass to be mixed is first moved vertically in one direction at that point by one set of blades, after which the other set of blades moves it in the other direction, whereby all parts and ingredients of the mass become thoroughly agitated and mixed. (See arrows in Fig. 4.) The blades are furthermore spirally arranged and in such a manner that they also work the mass constantly from each end toward the center of the trough. For rotating the shafts each carries at one end a cog-wheel 22, which cog-wheels are alined and operated by a pinion 23, meshing into each and supported between them on a stud-shaft 24. This latter is rigidly secured and supported in the adjacent trunnion-journal 11. The pinion is rotated by means of a pulley 25, which is rigidly mounted on its hub, so that they rotate together. The connection of these two for common operation might also be accomplished in a different manner. It is preferable to provide also a loose pulley 26, which is mounted at the outer end of the extended shaft.

27 is a belt-shifter provided with a hub 28, whereby it is carried at the end of a rod 29, to which it is held by a set-screw 31. The bore of this hub and the end of rod 29 which it receives are round, so that the belt-shifter may be adjusted tangentially with reference to the pulleys to meet the angle of the belt. The other part of rod 29 is square and supported in a bearing 32, thus preventing it from turning, and within which bearing it may be slid back and forth from one pulley to the other by a handle 33. Bearing 32 is carried at the end of an arm 34, which has on its other end a hub 35, whereby it is mounted on the extreme end of stud-shaft 24. It can be swung on this end to suit the location of the belt, after which it is held in adjusted position by means of a set-screw 36. The belt-shifter may also be swung on rod 29 to the other side (see dotted lines in Figs. 1 and 3) in case the position of the belt requires it.

Lubricant is supplied to the shaft-bearings through oil-holes 37. To prevent any of this oil reaching the interior of the vessel through the openings where the shafts extend, I enlarge the bore of the bearings immediately outside of the head, as shown at 38, leaving the shaft entirely free at that point, so that the oil is not confined thereat by this inner surface of the bearing. This enlarged portion is furthermore left open, as shown at 39, so that any superfluous oil working out of the bearings will enter this enlarged part 38, which it is unable to traverse and from which it escapes through opening 39.

The openings in the heads through which the shafts pass are packed to render them liquid-tight, the packing 41 being seated in the enlarged part 38 of the bearing and in the end next to the head of the vessel, which part thus serves as a stuffing-box. This packing is held in place by a gland 42, the lugs 43 of which extend outwardly through the open parts 39 of the enlarged part of the bearing. They are held in place by bolts, the heads 44 of which occupy recesses 45, formed on the outside in the ends of the vessel and the ends of which project through holes or slots in the lugs 43. Nuts 46 are finally applied on the outside to the ends of these bolts, whereby the gland is held in position. These bolts, as well as the glands, are placed in position before the shafts are placed in position, the glands being introduced through openings 39. The size of these openings is such as to prevent them from being closed by lugs 43 when the gland is in position, thus preventing interference with the other function of this enlarged open bearing, which is to prevent oil from entering the vessel and to provide for escape of such oil. For tilting this vessel I provide a worm-wheel 47 on one of the trunnions 11, preferably on the one on the left side of the machine, the particular trunnion being extended for such purpose beyond its bearing 12. This wheel, which need not be a complete one, since the vessel does not make a complete turn, is operated by a worm 48, mounted in boxes 49 and manipulated by a hand-wheel 51. The end frames which support the vessel are notched in front, as shown at 52, in order to clear the bearings of the front shaft while the vessel is tilted. The end of the notch may serve as a stop to limit the tilting motion of the vessel. It may, however, come also to rest against a tie-rod 53 in front. In normal position the bearings of the rear shaft rest on stops 54. The vessel may be dumped while the machine is in operation, in which case the direction of rotation of the blades of the front shaft is such as to favor the evacuation of the contents from the vessel.

The agitating devices as to shape and number may be more or less modified to accommodate more suitably special purposes of use and particular substances operated upon.

Having described my invention, I claim as new—

In a mixing-machine, the combination of a trough-shaped receiving vessel, parallel shafts arranged lengthwise therein in a horizontal position, agitating devices mounted on these shafts, means to rotate them in the same direction, bearings for these shafts projecting from the outside of the ends of the receiving vessel, trunnion-journals, one each also projecting from these ends and arranged centrally between the shaft-bearings on each side, bearings for these trunnion-journals, frames at each end of the machine of which these bearings form a part, stops 54 against which the bearings of one shaft come to rest when the mixing-trough is in normal position and notches 52 in each end frame to clear the bearings of the other shaft when the trough is tilted and to also limit its movement in the tilting position.

In testimony whereof I hereunto set my signature in the presence of two witnesses.

HENRY C. CHAMBERS.

Witnesses:
C. SPENGEL,
ARTHUR KLINE.